US005604649A

United States Patent [19]
Hernandez

[11] Patent Number: 5,604,649
[45] Date of Patent: Feb. 18, 1997

[54] DISK DRIVE SYSTEM HAVING A NOVEL HEAD GIMBAL ASSEMBLY WITH A SINGLE OFFSET MOUNTING PLATE ON EACH ACTUATOR ARM

[75] Inventor: Manuel A. Hernandez, San Jose, Calif.

[73] Assignee: International Business Machines, Armonk, N.Y.

[21] Appl. No.: 670,039

[22] Filed: Jun. 25, 1996

Related U.S. Application Data

[63] Continuation of Ser. No. 488,006, Jun. 7, 1995, abandoned, which is a continuation of Ser. No. 173,527, Dec. 23, 1993, abandoned.

[51] Int. Cl.⁶ ......................................................... G11B 5/48
[52] U.S. Cl. ............................................................. 360/104
[58] Field of Search ....................................... 360/104–105

[56] References Cited

U.S. PATENT DOCUMENTS

| | | | |
|---|---|---|---|
| 4,835,641 | 5/1989 | Maeda | 360/104 |
| 4,912,583 | 3/1990 | Hinlein | 360/104 |
| 4,943,875 | 7/1990 | Reidenbach et al. | 360/104 |
| 4,947,275 | 8/1990 | Hinlein | 360/104 |
| 5,027,241 | 6/1991 | Hatch et al. | 360/105 |
| 5,063,465 | 11/1991 | Fujioka | 360/104 |
| 5,146,450 | 9/1992 | Brooks et al. | 360/105 |
| 5,153,794 | 10/1992 | Hinlein | 360/104 |
| 5,172,286 | 12/1992 | Jurgenson | 360/104 |
| 5,184,265 | 2/1993 | Foote et al. | 360/104 |
| 5,185,683 | 2/1993 | Oberg et al. | 360/104 |
| 5,187,626 | 2/1993 | Hopkins et al. | 360/104 |
| 5,225,949 | 7/1993 | King et al. | 360/104 |
| 5,262,911 | 11/1993 | Cain et al. | 360/104 |
| 5,291,360 | 3/1994 | Foote | 360/104 |
| 5,367,420 | 11/1994 | Yagi et al. | 360/104 |
| 5,381,289 | 1/1995 | Fiedler | 360/104 |
| 5,422,770 | 6/1995 | Alt | 360/104 |

FOREIGN PATENT DOCUMENTS

| | | |
|---|---|---|
| 438806A2 | 7/1991 | European Pat. Off. . |
| 59-116955 | 7/1984 | Japan . |
| 1-294278 | 11/1989 | Japan . |
| 2-294977 | 12/1990 | Japan . |

OTHER PUBLICATIONS

IBM Technical Disc. Bulletin vol. 26 No. 3A Aug. 1983, J. M. Rigotti, "Transducer Suspension Suppressor Clip".
IBM Technical Disc. Bulletin vol. 27 No. 1A Jun. 1984, G. G. Gill et al., "Low-Cost Bimetal Suspension Mounting Surface For A Mechanized R/W Suspension Attachment".
IBM Technical Disc. Bulletin vol. 28 No. 6 Nov. 1985, K. A. Krause et al., "Suspension to Arm Attachment With Ramp Plate Structure For Magnetic Recording Head".

(List continued on next page.)

*Primary Examiner*—Stuart S. Levy
*Assistant Examiner*—Brian E. Miller
*Attorney, Agent, or Firm*—Andrew J. Dillon; Max Ciccarelli

[57] ABSTRACT

The improved disk drive system has an improved head gimbal assembly having a mounting plate with an attachment portion for attachment to an actuator arm and a distal end for mounting the read/write heads, or load beam assemblies, thereto. The mounting portion and distal end of the mounting plate are vertically offset such that when the attachment portion is attached to the actuator arm, the distal end of the mounting plate is centered between opposing sides of adjacent disks, thereby permitting a smaller spacing between adjacent disks. The new swage type connection between the mounting plate and the actuator arm has a hole in the actuator arm and has a spud located on the attachment portion of the mounting plate. The spud has a cylinder having an outer diameter such that the cylinder can fit inside the actuator arm hole. A distal end of the cylinder has a lip protruding inwardly from an inside diameter of the cylinder. The cylinder has a length such that when the cylinder is inserted into the actuator arm hole, the lip and the distal end of the cylinder extend beyond the thickness of the actuator arm around the actuator arm hole so that when the spud is swaged while in the actuator arm hole, the lip and the distal end of the cylinder expand into an area outside the actuator arm hole.

8 Claims, 7 Drawing Sheets

OTHER PUBLICATIONS

IBM Technical Disc. Bulletin vol. 28 No. 6 Nov. 1985, G. S. Pal, "Rigid Ramp Head Suspension Formed Integrally With Load Beam".

IBM Technical Disc. Bulletin vol. 29 No. 1 Jun. 1986, G. S. Pal, "Self–Aligning Suspension To Arm Attachment By Rivets".

IBM Technical Disc. Bulletin vol. 30 No. 1 Apr. 1988, B. M. Brue et al., "Head Bar Attachment".

IBM Technical Disc. Bulletin vol. 31 No. 12 May 1989, K. H. Elser et al., "Integrated Arm–Head Suspension For Magnetic Disk Files".

IBM Technical Disc. Bulletin vol. 31 No. 10 Mar. 1989, W. W. Brooks et al., "High Performance Plastic Arm For Hard File Actuator Head/Suspension Assembly".

IBM Technical Disc. Bulletin vol. 32 No. 8A Jan. 1990, G. D. Malagrino, Jr., "Head Suspension Assembly Snap–In Mount (For Current Swage Mount)".

IBM Technical Disc. Bulletin vol. 32 No. 8B Jan. 1990, W. W. Brooks et al., "Clad Metal Hard File Arm".

IBM Technical Disc. Bulletin vol. 33 No. 3A Aug. 1990, M. Barenboim et al., "Assembly Fixture For Magnetic Read/Write Head Suspension Assemblies".

IBM Technical Disc. Bulletin vol. 34 No. 8 Jan. 1992, M. Barenboim et al., "Corsair Comb Load Workstation".

IBM Technical Disc. Bulletin vol. 34 No. Jan. 1992, W. K. Anderson, "Head Suspension Assembly Magazine".

IBM Research Disc. TDB No. 247 Nov. 1984, W. E. Steele, "Suspension Attachment By Hollow Rivets".

PRIOR ART

DISK DRIVE SYSTEM HAVING A NOVEL HEAD GIMBAL ASSEMBLY WITH A SINGLE OFFSET MOUNTING PLATE ON EACH ACTUATOR ARM

This is a continuation, of application Ser. No. 08/488,006, filed Jun. 7, 1995 now abandoned which is a continuation of application Ser. No. 08/173,527, filed Dec. 23, 1993 now abandoned.

BACKGROUND OF THE INVENTION

1. Technical Field

The present invention relates in general to improvements in disk drive systems and in particular to head gimbal assemblies for mounting read/write heads to an actuator hub, and to swage attachments for attaching head gimbal assemblies to actuator hubs.

2. Description of the Related Art

It has been a continuing objective of the disk drive industry to produce disk drive systems of increasing storage capacity, decreased size (or "form factor" as often used in the industry), and faster response time. One approach to increasing the storage capacity of a disk drive is to increase the number of disks. However, as the number of disks increases, the height of the disk drive also increases. To maintain the desired form factor of the disk drive, workers in the art are continually trying to reduce the sparing between disks. However, the space between disks must be sufficient to accommodate two read/write heads and two load beam assemblies on which the read/write heads are mounted.

While trying to reduce the spacing between disks, workers in the art are also trying to reduce the mass of the actuator and head gimbal assembly so as to decrease the response time of the disk drive. One way of reducing the mass of the head gimbal assembly is to bring the actuator hub closer to the center of the disk stack. This results in shorter, and thus lighter, head gimbal assemblies, and also in a disk drive having a smaller foot print.

One way to achieve the smallest possible spacing between the actuator hub and the center of the disk stack is for the actuator arms to fit between the disks. Therefore, the space between disks must be sufficient to accommodate not only two read/write heads and two load beam assemblies on which the read/write heads are mounted, but also an actuator arm and the attachment means for attaching the head gimbal assembly to the arm.

Figure 7:
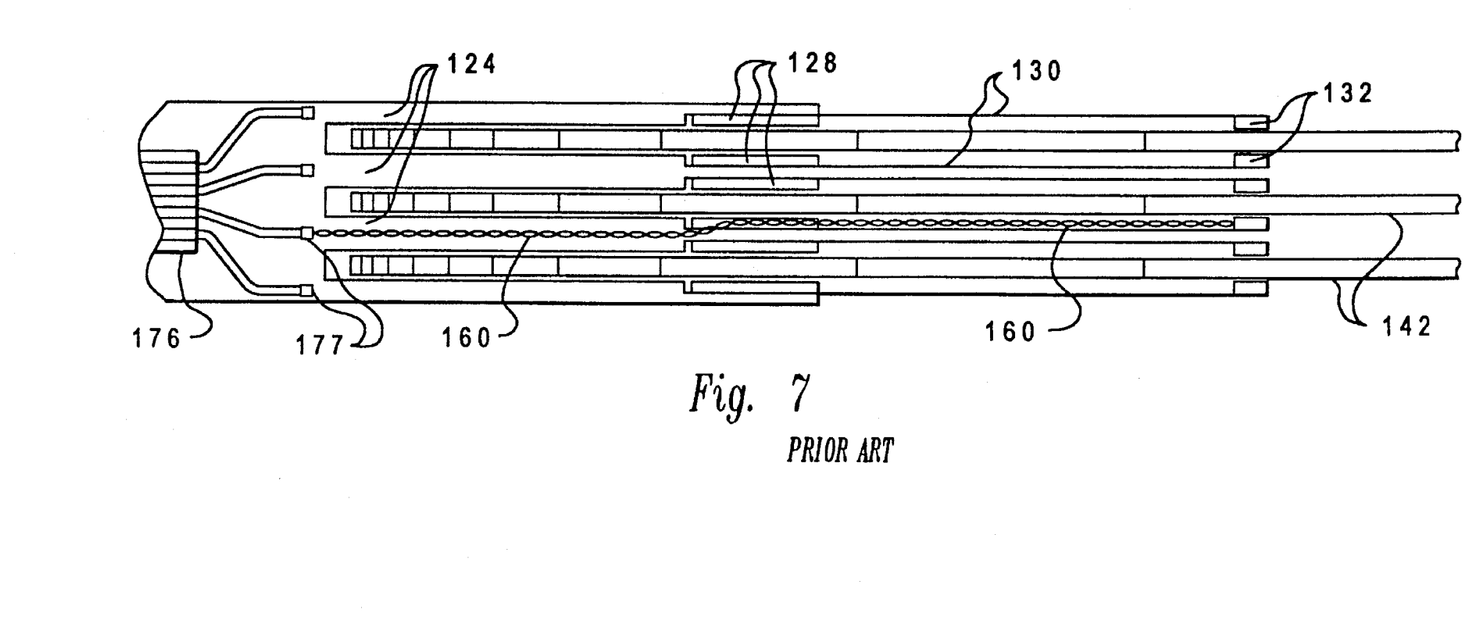
FIG. 7 is a side view of prior art head gimbal assemblies attached to an actuator, showing only some wiring for clarity.

FIG. 7 shows one type of prior art head gimbal assembly attached to an actuator hub. As is shown in FIG. 7, each load beam 130 is connected to an actuator arm 124 by a mounting member 128. Therefore, each actuator arm 124, except for the upper and lower ones, has two load beams 130 attached to it by means of two mounting members 128. This means that between two disks 142 are located two load beams 130, one actuator arm 124, and two mounting members 128. Having two mounting members 128, one on each side of arm 124 adds considerably to the spacing required between disks.

Other prior art disk drives attempt to reduce the number of components between disks by attaching the load beams directly to the actuator arms, as, for example, by welding the load beams directly to the actuator arms. However, with the spacing between disks, and hence the spacing between actuator arms getting smaller and smaller, it is becoming harder and harder to weld, or otherwise attach, the load beams directly to the actuator arms.

Certain prior art disk drives attempt to reduce the number of components between disks by attaching the load beams to the same side of the actuator arm, requiring only one attachment means and thus less vertical room. However, this configuration is inadequate because the fixed ends of the two load beams are in contact with each other and thus allow undesirable vibrations to pass from one load beam to the other load beam.

Some prior art head gimbal assemblies, as explained above, are attached to actuator arms by attaching the load beams directly to the actuator arms. A different type of prior art head gimbal assemblies use a mounting plate onto which the load beams are mounted. The load beams are mounted to the mounting plate before the mounting plate is attached to the actuator arm. This makes attaching the load beams to the mounting plate easier since more room is available to make the attachment. Once the load beam assemblies are mounted onto the mounting plate, then the mounting plate is attached to the actuator arm.

One method of attaching the head gimbal assemblies to the actuator arms is by means of swaging techniques. Prior art swaging techniques involved swaging a spud made of a hard material into an actuator arm made of a soft material. During prior art swage processes, a hard ball enlarges the spud cylinder, thus forcing the outside surface of the spud cylinder into the inside surface of the actuator arm hole, causing the outside surface of the spud cylinder to "bite" into the inside surface of the actuator arm hole. However, with the spacing between disks getting progressively smaller, the actuator arms must be made thinner and thinner. In order for the actuator arms to have sufficient rigidity and strength they sometimes need to be constructed of harder materials. Although swage connections are well known in the art, if a hard material is used for both the spud and the actuator arm, the current swaging techniques will not work adequately since the hard spud will not easily "bite" into the hard actuator arm hole.

SUMMARY OF THE INVENTION

It is therefore an object of the present invention to provide an improved disk drive assembly.

It is another object of the present invention to provide an improved disk drive assembly having actuator arms that fit in between the disks of the disk stack.

It is another object of the present invention to provide an improved disk drive assembly having a head gimbal assembly that permits closer disk spaeing.

It is another object of the present invention to provide an improved disk drive assembly having a lighter head gimbal assembly to permit a faster response time.

It is another object of the present invention to provide an improved disk drive assembly having a new swage attachment for attaching a hard member to a hard actuator arm.

The foregoing objects are achieved as is now described. The improved disk drive system has an improved head gimbal assembly having a mounting plate with an attachment portion for attachment to an actuator arm and a distal end for mounting the read/write heads, or load beam assemblies, thereto. The mounting portion and distal end of the mounting plate are vertically offset such that when the attachment portion is attached to the actuator arm, the distal end of the mounting plate is centered between opposing sides of adjacent disks, thereby permitting a smaller spacing between adjacent disks. The new swage-type connection between the mounting plate and the actuator arm has a hole in the actuator arm and a spud located on the attachment portion of the mounting plate. The spud has a cylinder having an outer diameter such that the cylinder can fit inside the actuator arm hole. A distal end of the cylinder has a lip protruding inwardly from an inside diameter of the cylinder. The cylinder has a length such that when the cylinder is inserted into the actuator arm hole, the lip and the distal end of the cylinder extend beyond the thickness of the actuator arm around the actuator arm hole so that when the spud is swaged while in the actuator arm hole, the lip and the distal end of the cylinder expand into an area outside the actuator arm hole.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
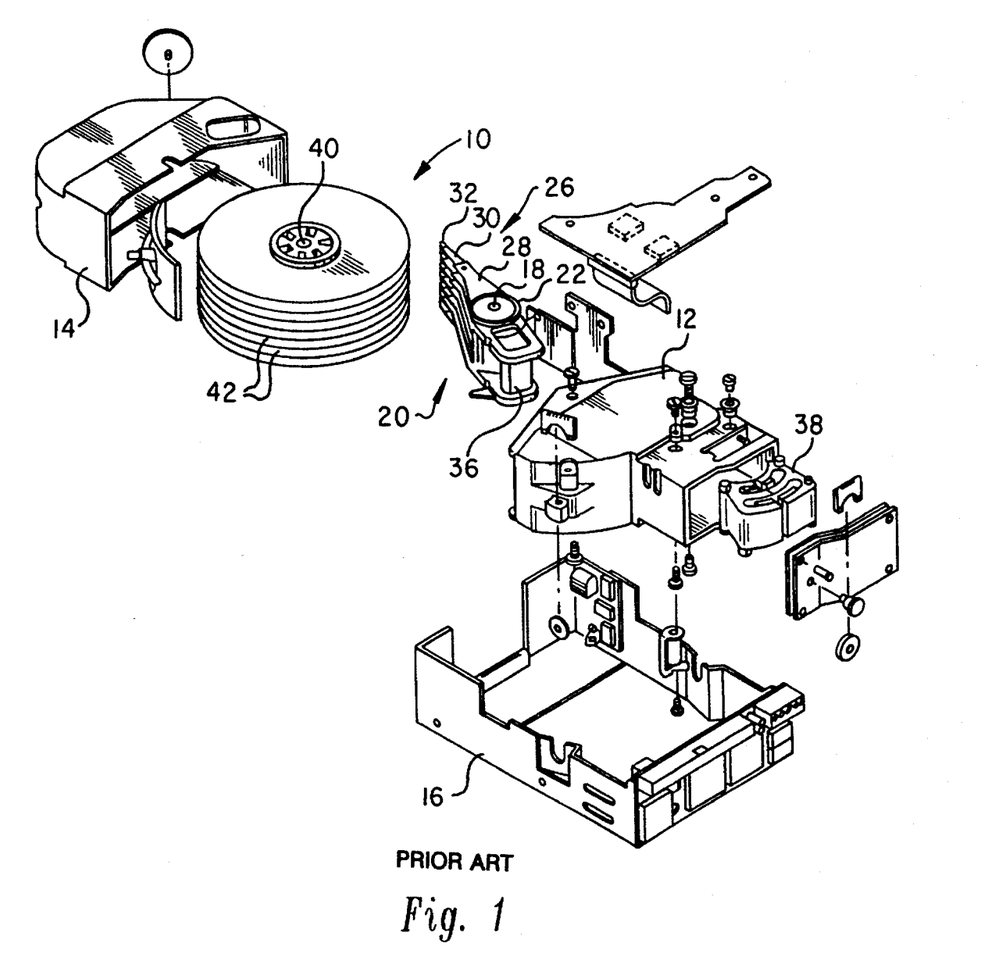
FIG 1 is an exploded view of a representative disk drive system.

With reference now to the figures and in particular with reference to FIG. 1, there is depicted an exploded view of a representative disk drive system or disk drive 10. It should be noted that although a rotary actuator is shown, the invention described herein is applicable to linear actuators. The disk drive 10 includes a housing 12, and a housing cover 14 which, after assembly, is mounted within a frame 16. Rotatably attached within the housing 12 on an actuator shaft 18 is an actuator assembly 20. One end of the actuator assembly 20 includes an E block or actuator hub 22 having a plurality of radially extending actuator arms 24 (hidden from view in FIG. 1). Attached to the separate actuator arms 24 of hub 22 are head gimbal assemblies 26. Each head gimbal assembly 26 includes a mounting plate 28 attached to one of actuator arms 24. Attached to the end of mounting plate 28 are one or two load beams 30. Attached at the end of each load beam 30 is a slider 32 which carries a pair of magnetic transducers or read/write head 34 (shown in FIG. 2). On the other end of the actuator assembly 20, opposite the load beams 30 and the sliders 32, is a rotating means for rotating hub 22. The rotating means is shown as a voice coil 36 and magnets 38. Magnets 38 are attached within housing 12. Magnets 38 and the voice coil 38 are the key parts of a voice coil motor which applies a force to the actuator assembly 20 to rotate it about the actuator shaft 18.

Also mounted within housing 12 is a spindle shaft 40. Rotatably attached to spindle shaft 40 are a number of vertically spaced apart magnetic disks 42. An internal motor (not shown) rotates the disks 42. Disk drive 10 also has circuitry to control the disk motor and the voice coil motor to allow selective positioning of the read/write heads over the disks.

Figure 2:
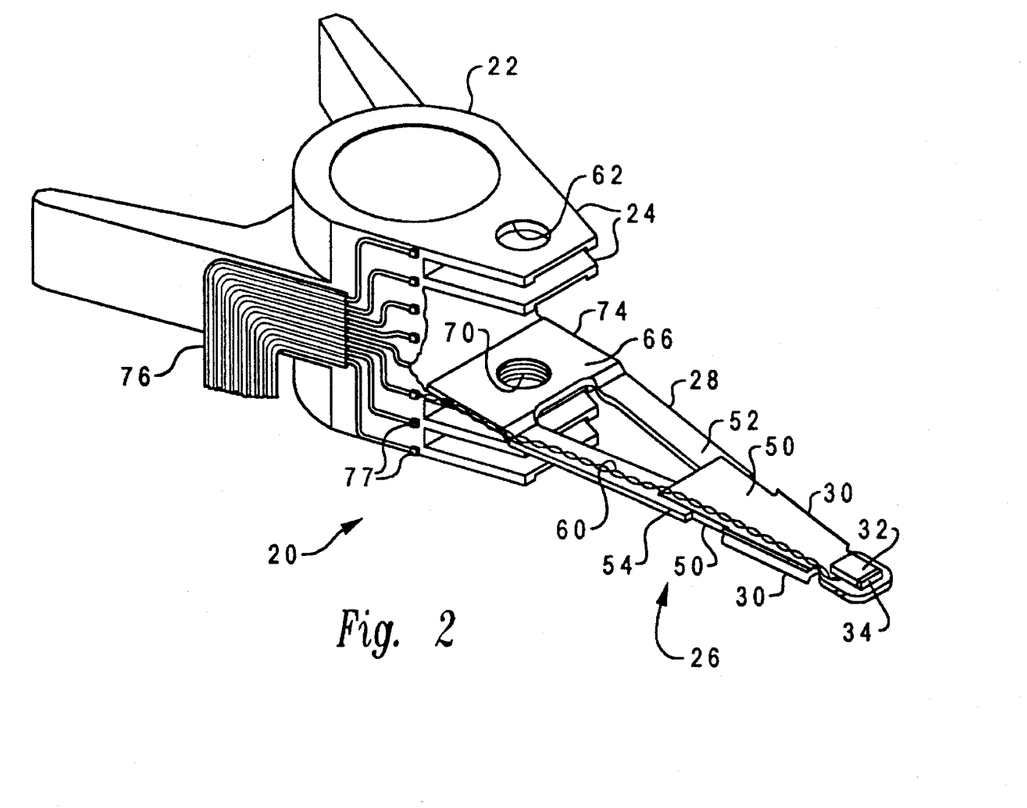
FIG. 2 is a perspective view of an actuator hub and a head gimbal assembly of the present invention, showing only some of the actuator arms for clarity.
Figure 3:
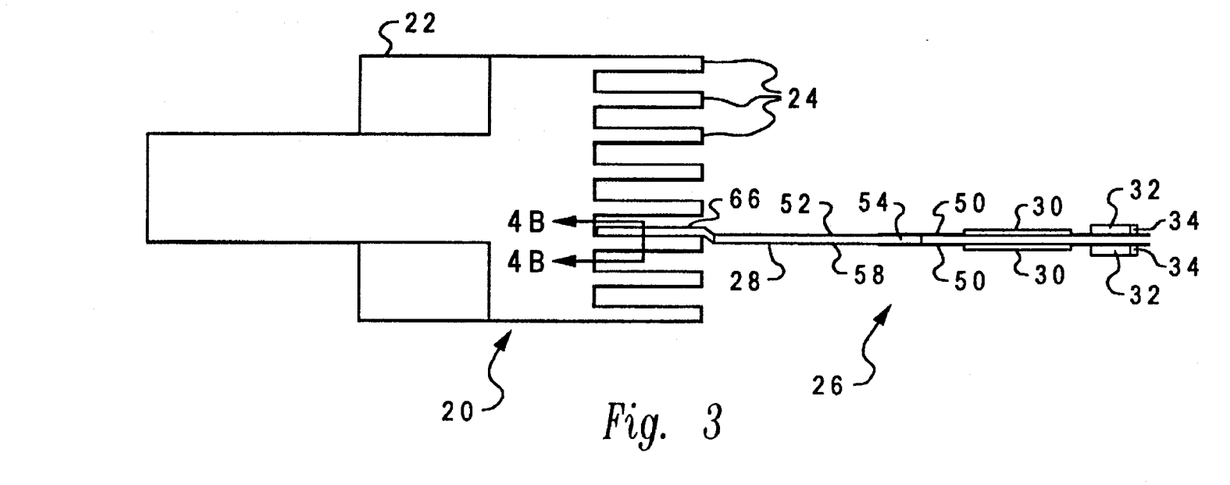
FIG. 3 is a side view of the actuator hub and head gimbal assembly of FIG. 2, showing all the actuator arms but not showing the wiring.
Figure 4A:
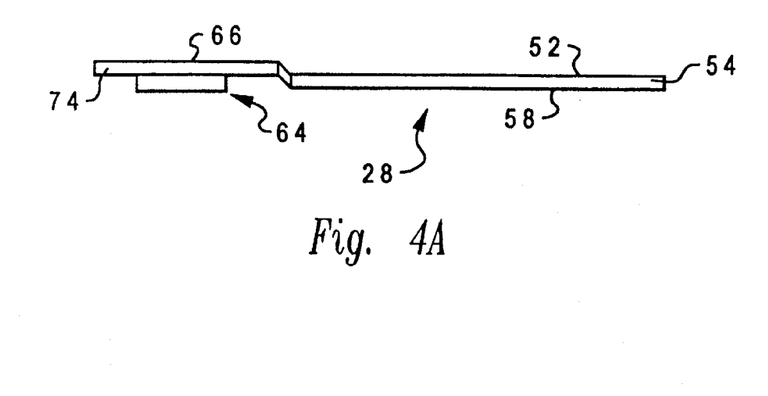
FIG. 4A is a side view of the mounting plate of FIG. 2.
Figure 4B:
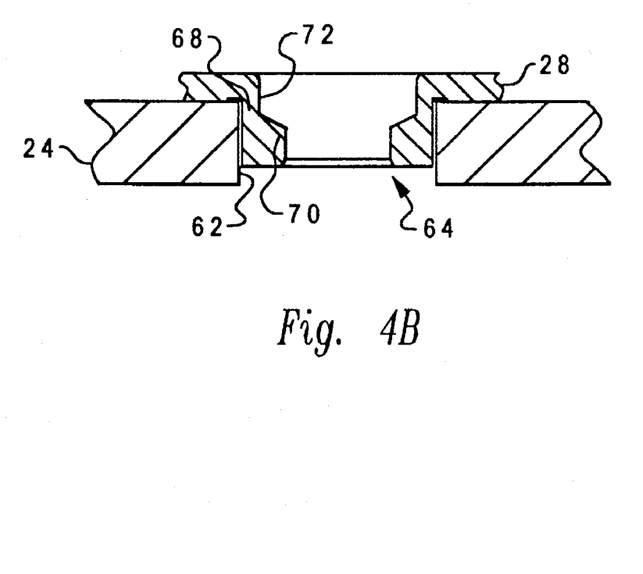
FIG. 4B is a cross sectional view of the spud taken along line 4B in FIG. 3, and shown before the spud is swaged into the actuator arm hole.

FIG. 2 details part of the actuator assembly. In particular, it shows hub 22 with a head gimbal assembly 28 attached thereto (only one head gimbal assembly 26, and only some actuator arms 24, are shown for better clarity). FIG. 3 is a side view of the actuator assembly shown in FIG. 2, and better shows some of the aspects of the present invention. Referring now mainly to FIGS. 2 and 3, head gimbal assembly 26 comprises a mounting plate 28 for supporting two load beams 30. One load beam 30 has a proximal end 50 attached to an upper face 52 of a distal end 54 of mounting plate 28. The second load beam 30 has a proximal end 50 attached to a lower face 58 of distal end 54 of mounting plate 28. Mounted to each load beam 30 is a slider 32 (only one slider 32 is shown in FIG. 2, the slider 32 on the lower load beam 30 is hidden from view). Each slider 32 supports a read/write head 34 attached to slider 32, and position so as to read from and/or write to the corresponding disk 42. Load beams 30 are resiliently flexible in the vertical direction to allow slider 32 to follow the topography of disks 42, and are rigid in the in-plane directions for precise slider positioning. Although not shown, a flexure is usually used to mount slider 32 to load beam 30. Also shown in FIG. 2, but not shown in FIG. 3, is wire 60 which runs from read/write heads 34, along the top of load beam 30, along the top and side of mounting plate 28, and to pad 77 where it connects to cable 76. The short length of arm 24, and the use of mounting plate 28 simplifies assembly since wire 60 can be routed and glued to head gimbal assembly 26 prior to attaching head gimbal assembly 26 to actuator arm 24.

Referring now mainly to FIGS. 2, 3, 4A, and 4B, hub 22 has radially extending actuator arms 24. Mounting plate 28 of head gimbal assembly 26 is attached to arm 24 by means of a swage connection. The swage connection consists of an actuator arm hole 62 located in arm 24 and a spud 64 (better shown in FIGS. 4A and 4B) protruding from an attachment portion 66 of mounting plate 28. Spud 64 has a cylinder 68 sized such that it fits inside hole 62. Cylinder 68 is of a length such that the cylinder is fully contained inside hole 62 and does not protrude beyond hole 62 when spud 64 is inserted into hole 62. Cylinder 68 has a lip 70 protruding inwardly from an inside diameter of cylinder 68. To make the swage connection, spud 64 is placed inside hole 62 and is then swaged by passing a hard ball through spud hole 72 of spud 64 to enlarge cylinder 68 thus causing the outside surface of cylinder 68 to be forced outward and into the inside surface of hole 62. This causes spud 64 to "bite" into hole 62 thereby fixedly attaching mounting plate 28, and hence head gimbal assembly 26, to actuator arm 24.

All the head gimbal assemblies are attached to the actuator arms in one step. Head gimbal assemblies 26, already assembled and with wires 60 already in place, are placed in their respective positions with spuds 64 located inside actuator arm holes 62. Then, with all head gimbal assemblies 26 in place, a ball is passed through all the spuds in one pass, thereby attaching all head gimbal assemblies 26 to arms 24. This minimizes the amount of work that must be done in the restricted spacing between actuator arms 24 during attachment of head gimbal assemblies 26 to arms 24.

Referring still mainly to FIGS. 2, 3, 4A, and 4B, an important feature of mounting plate 28 is depicted. Mounting plate 28 has a distal end 54 and a proximal end 74. Attachment portion 66 is located at proximal end 74. Attachment portion 66 and distal end 54 are vertically offset such that when mounting plate 28 is attached to arm 24 distal end 54 is centered between opposing sides of adjacent disks 24. The exact amount of vertical offset depends on the thickness of arms 24 and on the spacing between disks 42. Preferably, the offset is of a magnitude that results in distal end 54 of mounting plate 28 being exactly centered between two adjacent disks 42. However, certain applications might require different offsets.

Figure 5:
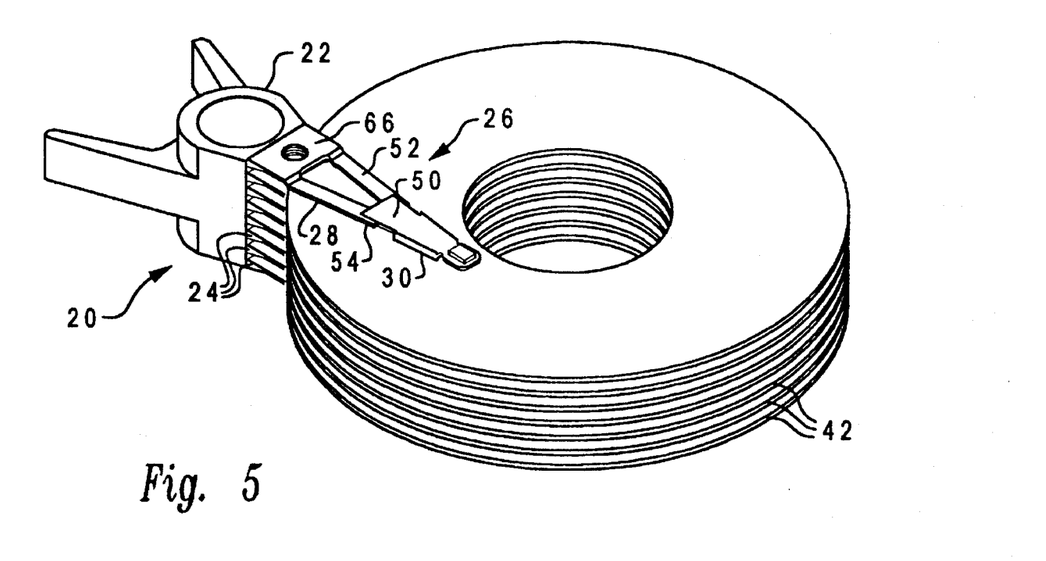
FIG. 5 is a perspective view of an actuator hub and head gimbal assemblies of the present invention interacting with a disk stack.
Figure 6:
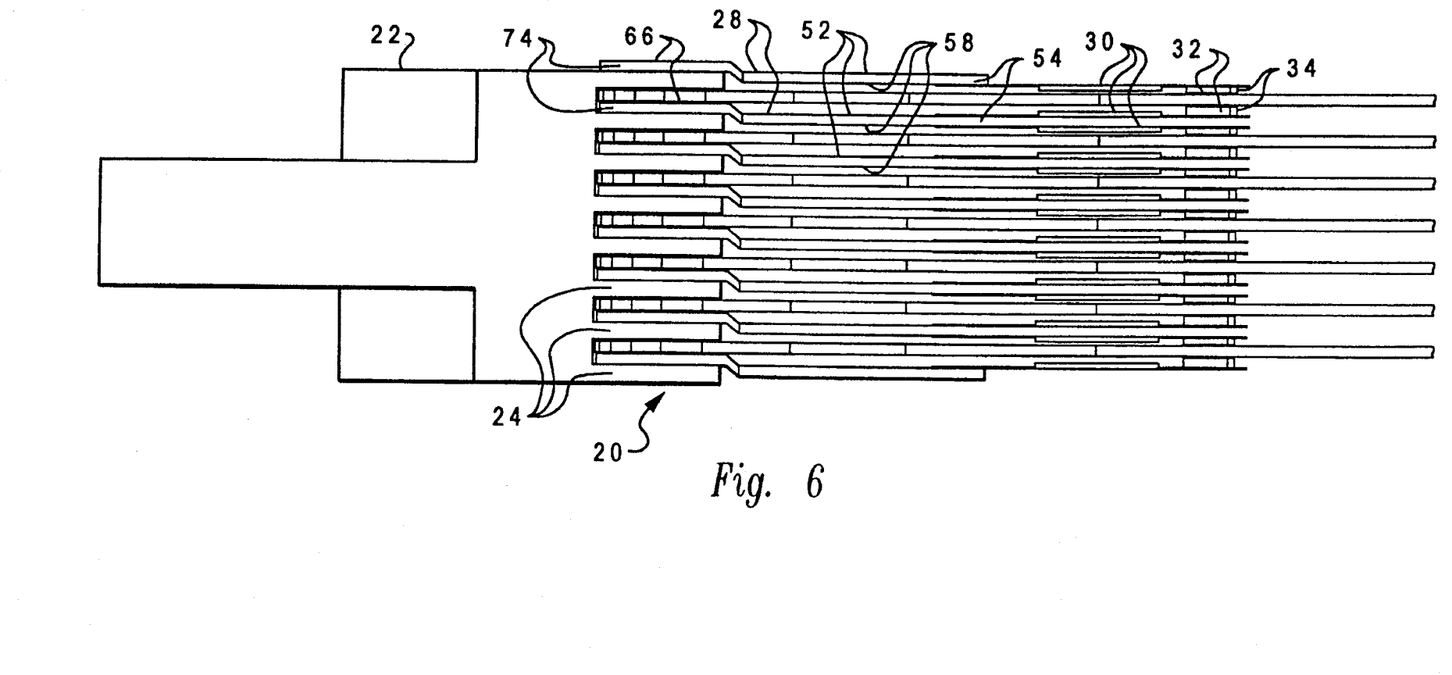
FIG. 6 is a side view of the actuator hub, head gimbal assemblies, and disk stack of FIG. 5.

FIG. 5 shows actuator assembly 20 with hub 22 having eight arms 24 and eight head gimbal assemblies 26 attached thereto. Uppermost and lowermost head gimbal assemblies 26 only have one load beam 30 and one slider 32 since only one disk surface needs to be read by these head gimbal assemblies 26. FIG. 6 shows a side view of the actuator assembly shown in FIG. 5. Referring now mainly to FIGS. 5 and 6, the interaction between head gimbal assemblies 26 and disks 42 is shown. Arms 24 fit between disks 42 to allow closer spacing of hub 22 to the center of disks 42. Only one mounting plate 28 is attached to each arm 24. Attachment portions 66 of mounting plates 28 and distal ends 54 of mounting plates 28 are offset vertically so that distal ends 54 are centered between opposing sides of adjacent disks 42. The offset in mounting plates 28 provides additional room, as compared to the prior art, between the upper faces 52 of distal ends 54 of mounting plates 28 and the adjacent surface of disk 42 so that additional room is created for accommodating upper load beams 30 and upper sliders 32, so that disks 42 can be spaced closer together. As shown in FIG. 6, offset mounting plates 28 result in two sliders 32, and thus two read/write heads 34, being mounted on one mounting plate 28. The use of offset mounting plate 28 also results in only one actuator arm 24 and one mounting plate 28 being located between adjacent disks 42, thereby decreasing the amount of room needed between disks 42. The prior art disk drives, on the other hand, as shown in FIG. 7, require two mounting members 128, in addition to an arm 124, between adjacent disks 142, thus requiring more room between disks 142.

Another feature of the present invention is best shown in FIG 2. In order to transfer information to and from read/write heads 34, wires 60 must extend from pad 77 to read/write heads 34. With the thickness of arms 24 and the spacing between arms 24 getting progressively smaller with decreasing disk drive size, it is becoming increasingly difficult to route and glue wires 60 in the small space between arms 24 and along the very thin sides of arms 24. The present invention, by using shorter arms 24 and making up the difference in length with mounting plate 28, causes a greater portion of wires 60 to be located along head gimbal assembly 26. Routing and gluing wires 60 onto head gimbal assembly 26 is easier than routing and gluing wires 60 onto arms 24, since on head gimbal assemblies 26, wires 60 can be routed and glued prior to attachment of head gimbal assemblies 26 onto arms 24. In contrast, the prior art, by using longer actuator arms 124 and by attaching load beams 130 to actuator arms 124, resulted in a considerable length of wire 160 being routed along the width of arm 124, or in between two arms 124 (as shown in FIG. 7). With the progressively decreasing arm thickness and decreasing spacing between arms, routing wires 160 along arm 124 is becoming increasingly difficult. The present invention offers a solution to the problem since the wires are nearly completely along head gimbal assembly 26.

Figure 8:
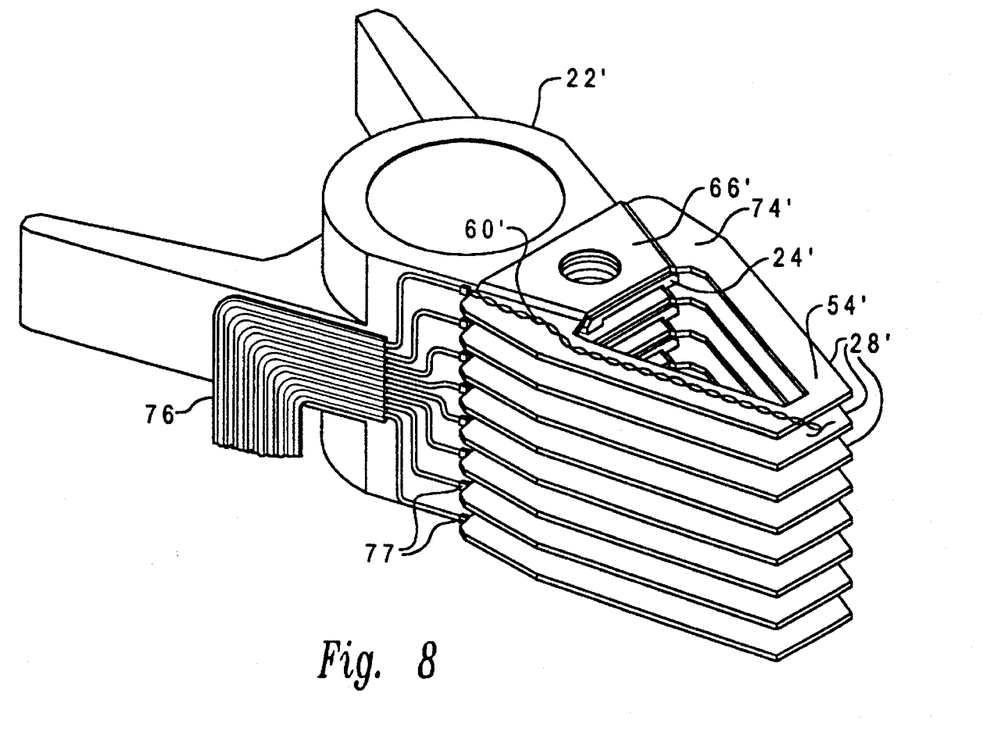
FIG. 8 is a perspective view of an alternative embodiment of the mounting plate of the present invention, showing several mounting plates mounted to an actuator hub.

The mounting plate shown in FIGS. 2–6 is only one of many possible embodiments of mounting plate 28. Mounting plate 28' shown in FIG. 8 is one of the many possible embodiments. Mounting plate 28' shown in FIG. 8 has a distal end 54' and a proximal end 74' just like mounting plate 28 of FIGS. 2–6. Mounting plate 28' also has an attachment portion 66' for attachment to arms 24' of hub 22'. Mounting plate 28' has an enlarged proximal end 74' to add stiffness and to provide additional room to guide wires 60'. The enlarged proximal end 74' that extends laterally beyond arms 24' permits wires 60' to be routed completely on mounting plate 28 and avoids the need to route wires 60' along arm 24'. The selection of the ideal mounting plate depends in large part on the particular application and the particular parameters that need to be optimized. The key feature of mounting plates 28 and 28' is the vertical offset between attachment portions 66, 66' and distal ends 54, 54'.

Figure 9:
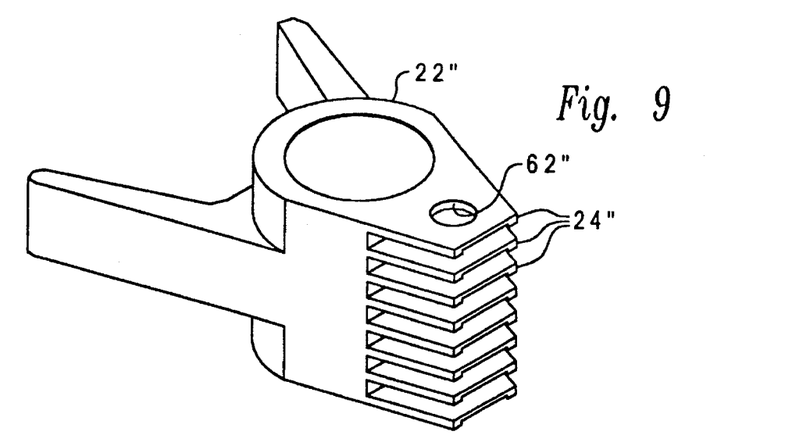
FIG. 9 is a perspective view of an embodiment of an actuator hub for use with the new swage connection of the present invention.
Figures 10, 11:
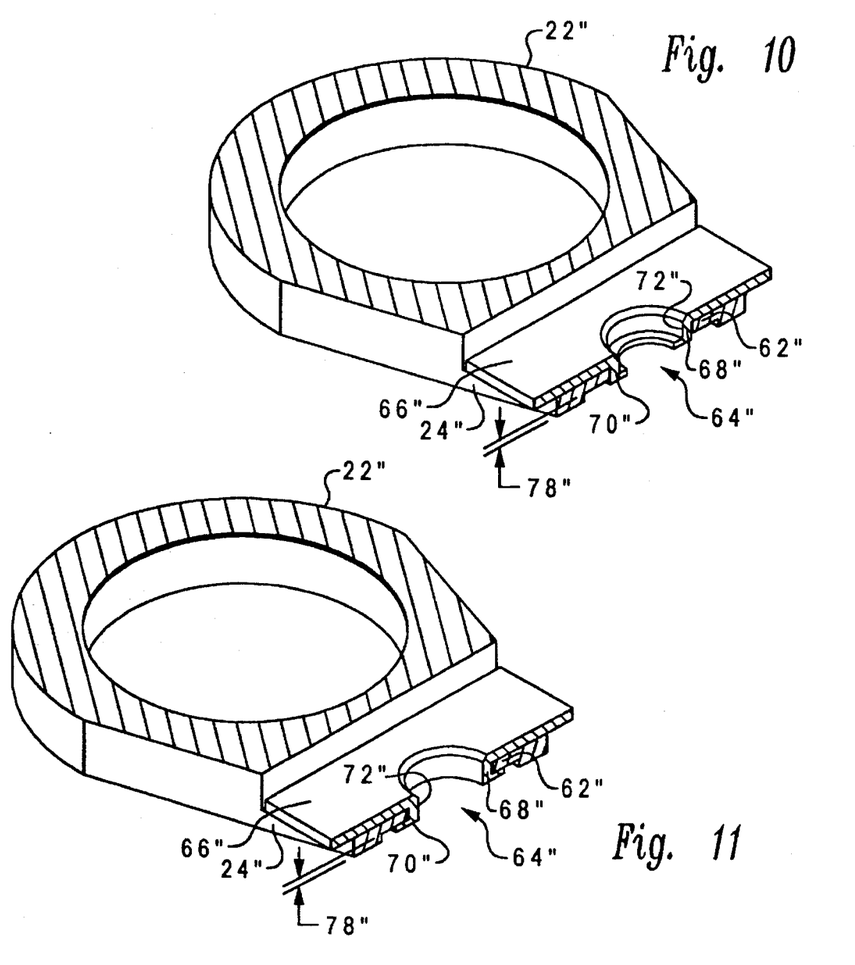
FIG. 10 is a perspective cross sectional view of a mounting plate located on an actuator arm, and showing the new spud attachment of the present invention before the spud is swaged; one cross section is taken horizontally across the actuator, and the offer cross section is taken vertically across the spud and actuator arm hole.
FIG. 11 is a perspective cross sectional view of a mounting plate located on an actuator arm showing the new spud attachment of the present invention after the spud is swaged; one cross section is taken horizontally across the actuator, and the other cross section is taken vertically across the spud and actuator arm hole.

Another embodiment of the present invention is shown in FIGS. 9–11. The embodiment of FIGS. 9–11 is the preferred swage attachment for disk drives that employ mounting plates and actuator arms that have similar hardnesses. In such disk drives, the conventional swage attachment used in the embodiment of FIGS. 2–6 would be inadequate because a hard spud cannot easily "bite", or expand, into a hard actuator arm hole. Referring now mainly to FIG. 10, the new swage attachment is shown before spud 64" is swaged into actuator arm hole 62". The new swage attachment consists of an actuator arm hole 62" located in arm 24" and spud 64" protruding from an attachment portion 66" of mounting plate 28'. Arm 24" has a thickness 78" around actuator arm hole 62". The thickness of the remainder of arm 24" can be the same as thickness 78", or it can be thicker, as shown in FIG. 9–11, to add stiffness. Spud 64" has a cylinder 68" sized such that it fits inside hole 62". A distal end of cylinder 68" has a lip 70" protruding inwardly from an inside diameter of cylinder 68". Cylinder 68" is of a length such that when the spud is inserted into hole 62", the distal end of cylinder 68" extends beyond thickness 78" of arm 24". Spud 64" is swaged into hole 62" by passing a hard ball through a spud hole 72" of spud 64". Referring now also to FIG. 11, when spud 64" is swaged, lip 70" and the distal end of cylinder 68" expand into a free area outside the actuator arm hole instead of expanding into the wall of actuator arm hole 62". As shown in FIG. 11, the expansion of lip 70' to an area outside hole 62' allows a positive attachment even if both the materials of mounting plate 28" and of arm 24" are hard.

While the invention has been particularly shown and described with reference to a preferred embodiment, it will be understood by those skilled in the art that various changes in form and detail may be made therein without departing from the spirit and scope of the invention.

I claim:

1. An improved head gimbal assembly for use in a disk drive system which permits smaller spacing between opposing surfaces of adjacent, vertically spaced apart magnetic disks, the improved head gimbal assembly comprising:

a mounting plate having an attachment end portion and a distal end portion having first and second sides;

the mounting plate further having a bend portion located between the attachment end portion and the distal end portion;

an actuator arm extending radially from an actuator hub in said disk drive system, said actuator arm having upper and lower surfaces;

said mounting plate being attached to only one of said upper and lower surfaces of said actuator arm;

said actuator arm having only one mounting plate attached thereto;

the other surface of said actuator arm being free of attachment to any mounting plate;

a first read/write head mounted to the first side of said distal end portion of said mounting plate, and a second read/write head mounted to the second side of said distal end portion of said mounting plate; and the attachment end portion and the distal end portion of said mounting plate being vertically offset from one another wherein a smaller spacing between said opposing surfaces of said adjacent, vertically spaced apart magnetic disks is obtained while allowing two read/write heads to be located between said opposing surfaces of said adjacent, vertically spaced apart magnetic disks.

2. An improved head gimbal assembly according to claim 1 further comprising:

the first read/write head being mounted to said mounting plate by means of a first load beam having a proximal end connected to said distal end portion of said mounting plate end having a distal end connected to said first read/write head; and the second read/write head being mounted to said mounting plate by means of a second load beam having a proximal end connected to said distal end portion of said mounting plate and having a distal end connected to said second read/write head.

3. An improved head gimbal assembly according to claim 1 wherein mild plate is attached to said actuator arm by means of a swage-type attachment.

4. A disk drive system comprising:

rotatably mounted, vertically spaced apart magnetic disks, a disk motor for rotating said rotatably mounted, vertically spaced apart magnetic disks, an actuator hub, an actuator hub motor, a control circuit for controlling said disk motor and said actuator hub motor to allow selective positioning of read/write heads over said rotatably mounted, vertically spaced apart magnetic disks;

a mounting plate having an attachment end portion and distal end portion having first and second sides;

the mounting plate further having a bend portion located between the attachment end portion and the distal end portion;

an actuator arm extending radially from an actuator hub in said disk drive system, said actuator arm having upper and lower surfaces;

said mounting plate being attached to only one of said upper and lower surfaces of said actuator arm;

said actuator arm having only one mounting plate attached thereto;

the other surface of said actuator arm being free of attachment to any mounting plate;

a first read/write head mounted to is the first side of said distal end portion of said mounting plate, and a second read/write head mounted to the second side of said distal end portion of said mounting plate; and the attachment end portion and the distal end portion of said mounting plate being vertically offset from one anothere wherein a smaller spacing between opposing surfaces of said rotatably mounted, vertically spaced apart magnetic disks is obtained while allowing two reed/write heads to be located between said opposing surfaces of said rotatably mounted, vertically spaced apart magnetic disks.

5. A disk drive system according to claim 4 further comprising:

the first read/write head being mounted to said mounting plate by means of a first load beam having a proximal end connected to said distal end portion of said mounting plate and having a distal end connected to said first read/write head; and the second read/write head being mounted to said mounting plate by means of a second load beam having a proximal end connected to said distal end portion of said mounting plate and having a distal end connected to said second read/write head.

6. A disk drive system according to claim 4 wherein said mounting plate is attached to said actuator arm by means of a swage-type attachment.

7. A disk drive system comprising:

rotatably mounted, vertically spaced apart magnetic disks, a disk motor for rotating said rotatably mounted, vertically spaced apart magnetic disks, an actuator hub, an actuator hub motor, a control circuit for controlling said disk motor and said actuator hub motor to allow selective positioning of read/write heads over said rotatably mounted, vertically spaced apart magnetic disks;

an actuator arm extending radially from said actuator hub, said actuator arm having an upper surface and a lower surface, said actuator arm being attached to a double-head gimbal assembly;

the double-head gimbal assembly having a mounting plate having an attachment end portion for attachment to said actuator arm, a first load beam having a proximal end attached to a first face of a distal end portion of said mounting plate, a second load beam having a proximal end attached to a second face of said distal end portion of said mounting plate, a first slider mounted to said distal end of said first load beam, a second slider mounted to said distal end of said second load beam, a first read/write head attached to said first slider, a second read/write head attached to said second slider;

the mounting plate being attached to only one of said upper and lower surfaces of said actuator arm;

the other surface of said actuator arm being free of attachment to any mounting plate;

the mounting plate further having a bend portion located between the attachment end portion and the distal end portion;

said actuator arm having only one mounting plate attached thereto; and said attachment end portion of said mounting plate and the distal end portion of said mounting plate being vertically offset from one another wherein a smaller spacing between said opposing surfaces of said adjacent, vertically spaced apart magnetic disks is obtained.

8. The disk drive system according to claim 7 wherein said mounting plate is attached to said actuator arm by means of a swage-type attachment.

* * * * *

UNITED STATES PATENT AND TRADEMARK OFFICE
CERTIFICATE OF CORRECTION

PATENT NO. : 5,604,649
DATED : February 18, 1997
INVENTOR(S) : Hernandez

It is certified that error appears in the above-indentified patent and that said Letters Patent is hereby corrected as shown below:

Column 2, line 51: change "spaeing" to --spacing--

Column 3, line 55: change "offer" to --other--

Column 7, line 45: change "end" to --and-- (1st occurr.)

Column 7, line 53: change "mild plate" to --said mounting plate--

Column 8, line 13: delete "is"

Signed and Sealed this

Twenty-seventh Day of May, 1997

BRUCE LEHMAN

Attest:

Attesting Officer

Commissioner of Patents and Trademarks